(12) United States Patent
Dagenais

(10) Patent No.: US 8,695,198 B2
(45) Date of Patent: Apr. 15, 2014

(54) METHOD OF POSITIONING PIPES END TO END

(75) Inventor: Jean-François Dagenais, Cassis (FR)

(73) Assignee: Serimax, Mitry Mory (FR)

( * ) Notice: Subject to any disclaimer, the term of this patent is extended or adjusted under 35 U.S.C. 154(b) by 316 days.

(21) Appl. No.: 13/073,528

(22) Filed: Mar. 28, 2011

(65) Prior Publication Data

US 2012/0174372 A1   Jul. 12, 2012

(30) Foreign Application Priority Data

Jan. 11, 2011   (FR) ...................................... 11 50231

(51) Int. Cl.
*B23Q 3/00*   (2006.01)
(52) U.S. Cl.
USPC .............. 29/468; 29/466; 29/281.5; 228/212; 228/44.5
(58) Field of Classification Search
USPC .............. 29/464, 466, 467, 468, 33 D, 281.1, 29/281.4, 281.5, 282, 283; 228/44.3, 44.5, 228/212
See application file for complete search history.

(56) References Cited

U.S. PATENT DOCUMENTS

| 3,748,426 A | 7/1973 | Stanley |
| 3,974,356 A | 8/1976 | Nelson et al. |
| 2005/0087586 A1* | 4/2005 | Vermaat ........................ 228/212 |
| 2008/0193218 A1* | 8/2008 | Verkuijl et al. ............... 405/158 |

FOREIGN PATENT DOCUMENTS

WO   01/34340 A1   5/2001

OTHER PUBLICATIONS

U.S. Appl. No. 13/978,985, filed Aug. 27, 2013, Dagenais.

* cited by examiner

*Primary Examiner* — David Bryant
*Assistant Examiner* — Ryan J Walters
(74) *Attorney, Agent, or Firm* — Oblon, Spivak, McClelland, Maier & Neustadt, L.L.P.

(57) ABSTRACT

The present invention provides a method of positioning a first pipe facing a second pipe, the end of the first pipe being provided with a first chamfer and a first substantially annular surface placed close to its inside surface, the end of the second pipe being provided with a second chamfer and with a second substantially annular surface located close to its inside surface, said first and second annular surfaces defining a joint plane substantially perpendicular to the longitudinal axes of each of said pipes. According to the invention, a plurality of clamping actuators regularly distributed around the first and second pipes are used and controlled to shift the second pipe relative to the first pipe parallel to said joint plane as a function of a radial offset H, H' between the first and second annular surfaces so as to guarantee a maximum facing area, referred to as a "coincidence" area for said annular surfaces.

15 Claims, 3 Drawing Sheets

METHOD OF POSITIONING PIPES END TO END

TECHNICAL FIELD OF THE INVENTION

The invention relates to the field of positioning pipes facing each other, more precisely pipes that are placed end to end in order to weld their ends together. In general, in operations of this type, the pipes are first put into alignment and then clamped in order to hold them in an optimum position prior to weld them together.

The invention may also apply to applications other than assembly by welding, whenever there is a need to align pipes accurately and reliably, in particular pipes of large dimensions and/or of great weight.

For many years, diverse and various methods and devices have been used for these purposes.

STATE OF THE PRIOR ART

Mechanical solutions are known in which a ring carrying screw actuators that are regularly distributed around its circumference is placed around the outside surface (or wall) of a pipe, e.g. a metal pipe. In known manner, the ring is made up of two half-rings connected together by a hinge-type joint, which half-rings can thus be taken apart apart from each other in order to put a pipe into place or on the contrary remove it; in the closed position, the two half-rings constitute a ring that surrounds one or two pipes at their ends, and the screw actuators serve to deform and/or align them providing best possible fit-up.

Under such circumstances, mechanical screw-tightening performed by an operator enables localized pressures to be exerted in as many zones as there are actuators around the pipe. This makes it possible to deform said pipe, e.g. to ensure that an initially oval cylinder is made round.

When pipes are to be end welded together, such a ring serves to clamp and hold in position a pipe that may be deformed in order to obtain better coincidence between the profiles of the ends of each of the pipes; if each pipe end is fitted with such a ring, both rings being linked together, a finer match can be obtained between the end surfaces or edges by successive and respective deformations imparted to each of the ends. It is thus possible to achieve better welding.

More recently, numerous publications have dealt with this problem of positioning and clamping pipes in order to weld their ends together.

Thus, document WO 01/34340 discloses a method and a device whereby the outside wall of a first pipe is clamped and the outside of a second pipe is clamped by means of a rigid frame having first and second clamping assemblies mounted thereon; the two pipes can then be end welded together. Thereafter, the device can slide over the outside wall of one of the pipes towards another end where another weld is to be made.

That device enables each pipe for welding to be clamped and positioned, but in a manner that is rather coarse. Only the general shape and the outside diameter of one of the pipes appears to be taken into account in order to adjust the positioning and the clamping of the other pipe. Furthermore, it is known that manufacturing tolerances for pipes can lead to inside and outside diameters that are not concentric.

When welding pipes with chamfers, it is acknowledged to be necessary and most important to have excellent contact surfaces between the ends of the pipes in the joint plane. This problem is not dealt with in the prior art, which seeks at best to obtain good coincidence between the outlines or diameters of the pipes to be welded together.

The invention solves this problem in particular by seeking to refine the match between the contact shapes or surfaces of the pipes to be welded together, in their joint plane.

Furthermore, the prior art teaches clamping means located inside the pipes so as to enable their inside surfaces to be aligned as well as possible. In reality, the insides of pipes are not perfectly round and manufactured pipes are not perfect in geometrical and/or dimensional terms, so aligning pipes by means of their inside surfaces is sometimes found to be imperfect. As a result welds include defects, in particular for pipes having chamfered ends with root faces.

In known manner, chamfered pipes present ends as shown in FIGS. 2 and 3; a zone that is chamfered, e.g. at 45°, opens to the outside surface of each pipe, while an annular zone of right section constitutes the innermost portion of the pipe. Other chamfer profiles are also known, e.g. J-shaped profiles, and they are advantageously processed by means of the invention.

Similarly, certain chamfers do not present any annular zone, such that a chamfered zone then comprises solely a slope inclined relative to the inside wall of the pipe in question. It is then necessary to align as well as possible the edges or lines that are defined by the intersection between the inside wall of the pipe and the slope forming the chamfer.

In known manner, chamfers are made by using the inside wall of the pipe as a reference such that the shape located at the outside of the root face and/or of the pipe can vary as a function of manufacturing tolerances associated with the thickness of the pipe.

When external means are provided for clamping the pipes, such systems are complex or else, as mentioned above, they do not enable the root faces of the pipes to be put properly into contact. Surfaces that are "not properly in contact" are annular surfaces or indeed edges (for chamfered pipes without root faces) that do not face the corresponding surfaces or edges. For example this occurs when one or both of the pipes present an end that is oval instead of being circular; any other deformation of the pipes can give rise to problems of surfaces or shapes that do not coincide.

SUMMARY OF THE INVENTION

The invention seeks to remedy the drawbacks of the prior art and in particular to position the ends of two facing pipes in such a manner that the root faces or the edges of chamfers provided at each of the ends of the pipes present a maximum area of coincidence or minimal offset.

When pipes are positioned to be welded together by means of their ends as arranged in this way, this characteristic ensures better engagement for the first welding pass that is preferably performed subsequently.

The invention thus provides a positioning method for positioning a first pipe facing a second pipe via their ends, the end of the first pipe being provided with a first chamfer and a first substantially annular surface placed close to its inside surface, the end of the second pipe being provided with a second chamfer and with a second substantially annular surface located close to its inside surface, said first and second annular surfaces defining a joint plane substantially perpendicular to the longitudinal axes of each of said pipes.

The "substantially annular surface" may present a certain thickness corresponding to the different radii of each of the root faces of the chamfers of the first and second pipes; or else said surface may be reduced to a ring if at least one of the chamfers does not present a root face.

According to a first aspect of the invention, a plurality of clamping actuators regularly distributed around the first and second pipes are used and controlled to shift the second pipe relative to the first pipe parallel to said joint plane as a function of a radial offset between the first and second annular surfaces so as to guarantee a maximum facing area, referred to as a "coincidence" area for said annular surfaces.

The "radial offset between the first and second annular surfaces" is commonly referred to as a "hilo" in the field in question, being a contraction of the terms "high" and "low".

It has been found that the presence in the joint plane of one or more zones in which the facing annular surfaces of each of the pipes do not coincide gives rise to a hilo that is too great. This is harmful for the quality of the welding performed after said pipes have been positioned. In a manner that is entirely novel and unexpected, the present invention provides a solution to this problem.

The prior art neither teaches nor suggests such a method; since the prior art is not specifically interested in the hilo, the person skilled in the art is not even in a position to modify the prior art in order to achieve the present invention easily.

In another aspect of the invention, said radial offset or hilo, is evaluated and monitored either visually or by using specific sensors, and said offset is transmitted and processed by a calculation central unit co-operating with all or some of said actuators and enabling the movements thereof to be controlled.

Evaluating and monitoring the hilo in situ, and possibly in real time while performing the method, constitutes a characteristic of the invention that is novel and unexpected.

Such automation of the method enables very many geometrical offsets of pipes to be processed in a short time and in a manner that is very accurate, as explained below.

Preferably, said radial offset is evaluated and monitored all around the circumference either via the outside edges of the annular surfaces defining the bottoms of the chamfers, or via the edges of chamfers without root faces. For example, the offset may be evaluated at a plurality of points that are regularly distributed around the circumference. This evaluation of the offset may be performed by using specific tooling.

In an implementation of the invention, said radial offset H is evaluated and monitored relative to the inside walls of said pipes.

In another implementation of the invention, said radial offset H' is evaluated and monitored relative to the bottoms of the respective chamfers of said pipes. The root faces of the chamfers are generally of constant dimensions around the entire peripheries of the pipes so such an offset is reliable and easy to achieve.

Furthermore, prior to shifting the second pipe, the first end of the first pipe is clamped and the second pipe is brought approximately into alignment facing the first pipe, and the second pipe is clamped in this aligned position. Advantageously, clamping is performed via the outside walls of the pipes.

In an implementation of the invention applied to the ends of chamfered pipes without root faces, the radial offset H, H' between the end lines of said pipes is reduced while also being angularly distributed around the circumference of said end lines.

In a preferred implementation of the invention, said alignment of the pipes is performed initially on the outside surfaces of the first and second pipes.

In an implementation of the invention, a longitudinal gap of a few millimeters may be provided between the ends of the first and second pipes. When the alignment made by the invention is performed for the purpose of welding pipes together, this longitudinal gap is predefined and selected by the person skilled in the art as a function of the welding method used. The joint plane is then situated in the middle of the gap, parallel to the facing annular surfaces, and perpendicular to the longitudinal axis of the pipes.

According to an advantageous characteristic of the invention, once the ends of the pipes are clamped, said clamping actuators are controlled individually so as to enable the ends of the pipes to be shifted relative to each other while maintaining the clamping forces of said actuators on said pipes.

Advantageously, said first and/or second pipes is/are shifted relative to each other so as to obtain a coincidence area lying in the range 20% to 100% approximately of the area of the annular surface of the first and/or second pipes. Naturally, this value is given by way of illustration.

In addition, the actuators remain locked in a clamping position and maintain the forces applied to the first and/or second pipes after said shifts of said pipes are terminated.

According to another characteristic of the invention, the radial offset H, H' is locally modified by adjusting the position of at least one of said actuators individually and separately.

Furthermore, prior to clamping said first pipe, said actuators are positioned in such a manner that welding means are centered longitudinally on the end of the first pipe or on the joint plane defined between the first and second pipes. This constitutes a reference longitudinal position.

BRIEF DESCRIPTION OF THE FIGURES

Other characteristics, details, and advantages of the invention appear on reading the following description given with reference to the accompanying figures, in which.

For greater clarity, elements that are identical or similar are identified by identical reference signs in all of the figures.

DETAILED DESCRIPTION OF AN EMBODIMENT

Figure 1:
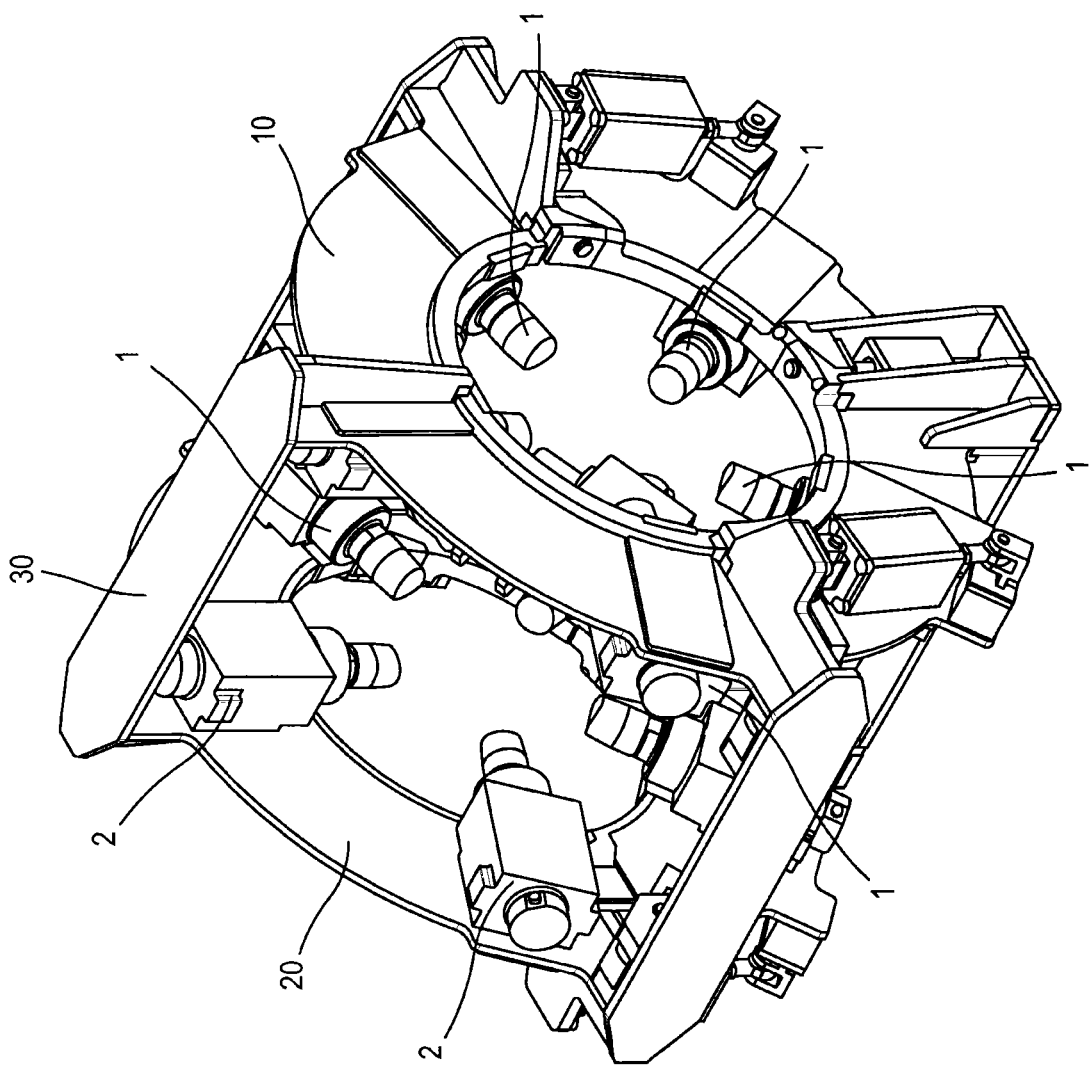
FIG. 1 is a simplified perspective view of a positioning and welding installation in an implementation of the invention.

FIG. 1 is a simplified perspective view of equipment suitable for implementing the invention. Advantageously, this equipment comprises a first series of actuators 1 for positioning at one end of a first pipe that is not shown. The actuators 1 may be fastened on a first ring 10 that supports them. The actuators 1 are preferably regularly distributed angularly around said end of the first pipe.

A second series of actuators 2 for positioning at one end of the second pipe (not shown) is fastened on a second ring 20 that supports them. The actuators 2 are preferably regularly distributed angularly around said end of the second pipe.

The first and second rings 10 and 20 are spaced apart in the length direction of the pipes for positioning; connection means 30 such as yokes, bars, or the like are provided in order to leave a volume, e.g. for passing welding means or other suitable pieces of equipment. The means 30 may be of fixed length or they may be of variable length in order to adjust the spacing between the ends of the pipes for positioning.

The rings 10 and 20 may be made up of a plurality of portions so as to take up a closed position in which they form continuous rings around the ends of the pipes, and an open position in which one or more portions are positioned so as to be spaced apart from the closed annular position. Means such as hinges then provide pivot connections for portions that are movable relative to stationary portions. Naturally, such an arrangement enables the pipe ends to be engaged or disengaged relative to the equipment, either for putting them into place prior to welding, or for disengaging them after welding.

The principle of such equipment is itself known and is not described in greater detail herein.

Starting with such equipment, the invention seeks to position one end of a first pipe 100 in specific and accurate manner relative to one end of a second pipe 200, in particular, but not necessarily, for the purpose of welding said pipes together via these ends thus placed end to end.

To do this, equipment of the above-specified equipment type is fitted with instruments and controls in a specific manner, as described below.

Figure 2A:
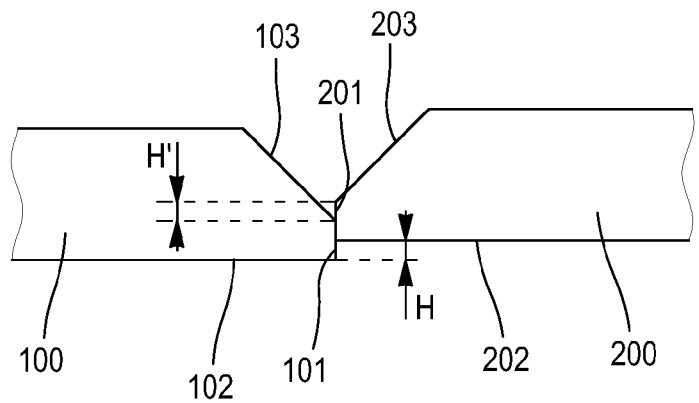
FIGS. 2A and 2B are fragmentary cross-sections of the junction zone between two chamfered pipes with root faces, in an implementation of the invention.
Figure 2B:
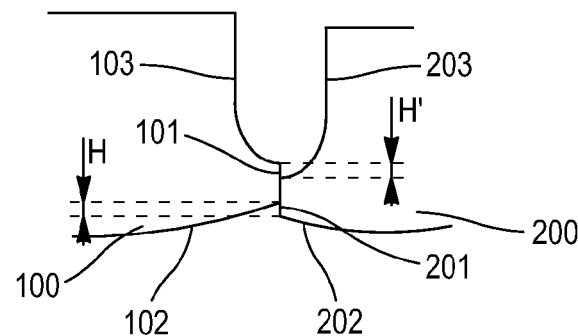

FIGS. 2A and 2B are diagrams of the ends of chamfered pipes 100 and 200 having root faces 101 and 201. In FIG. 2A, the chamfers 103 and 203 are straight, at 45°, whereas in FIG. 2B the chamfers are referred-to as J-shaped chamfers, because of the hollow J-shaped profiles 103 and 203. For J-shaped chamfers, the inside surfaces 102 and 202 of the first and second pipes respectively are generally slightly inclined (at a few degrees) relative to the longitudinal axis of the pipe in question.

Figure 2C:
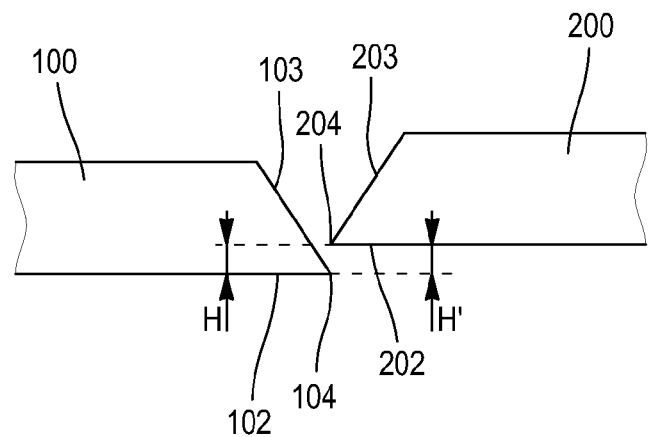
FIGS. 2C and 3C are fragmentary cross-sections of the junction zone between two chamfered pipes without root faces.

FIG. 2C is a diagram of pipe ends, each having a straight chamfer 103 or 203 inclined at 45°, but without a root face. In this situation, it is the respective lines 104 and 204 that constitute the facing ends of the two pipes 100 and 200.

Naturally, other chamfer profiles could be provided in the context of the invention. The person skilled in the art will select profiles that are appropriate for specific circumstances, and also the depths and the other dimensions of the chamfers and of the root faces 101 and 201, if any.

The invention thus seeks to provide a method of adjusting the alignment of pipes while they are being clamped externally, in particular, but not necessarily, for the purpose of subsequently welding them together. This is alignment in real time, associated with monitoring certain parameters that make such alignment possible.

It is assumed that no precise dimension of the pipes is known before they are positioned in accordance with the invention. Naturally, the pipes to be treated present shapes and dimensions that are similar.

The method is broken down as follows: a first end of a first pipe 100 is placed inside a piece of "clamping" equipment, e.g. as shown in FIG. 1. More precisely, the first end is placed in register with the first series of actuators 1; then the end of a second pipe is placed as accurately as possible inside the clamping equipment, facing the end of the first pipe.

If possible with the equipment used, the equipment is closed so that all of the actuators 1 and 2 are placed around the respective ends of the first and second pipes.

Sensing elements such as fingers (not shown) then serve to detect the exact longitudinal position of the facing chamfers, and then the equipment can be locked in such a manner that the actuators 1 and 2 are well positioned at each end of the first and second pipes 100 and 200.

The first actuators 1 are then advanced and clamped onto the end of the first pipe 100, as concentrically as possible relative to the frame. The actuators may advance at a speed up to 6 millimeters per second (mm/s) on starting. The speeds and the durations of their movements can be set.

On approaching the outside surface of the first pipe 100, the speed is preferably reduced, e.g. to 0.3 mm/s, and it is possible to synchronize accurately the movements of each of the actuators 1 that are distributed around the end of the first pipe 100.

Once clamping has been achieved, it is still possible to control each of the actuators independently, in terms of thrust force and stroke; this enables the clamping and the final positioning of the pipe end(s) to be optimized.

Figure 3A:
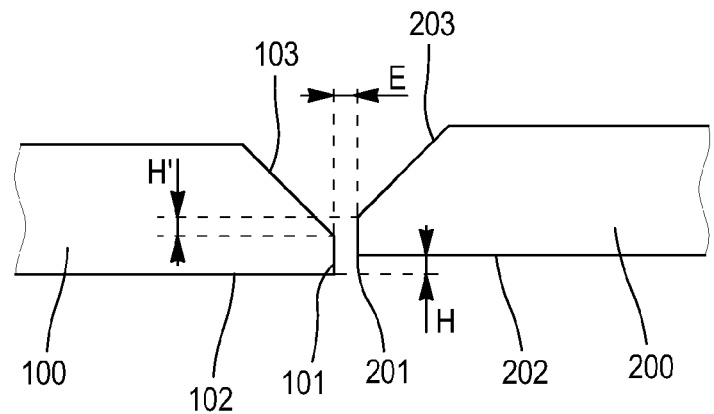
FIGS. 3A and 3B are fragmentary cross-sections of the junction zone between two chamfered pipes with root faces, in another implementation of the invention.
Figure 3B:
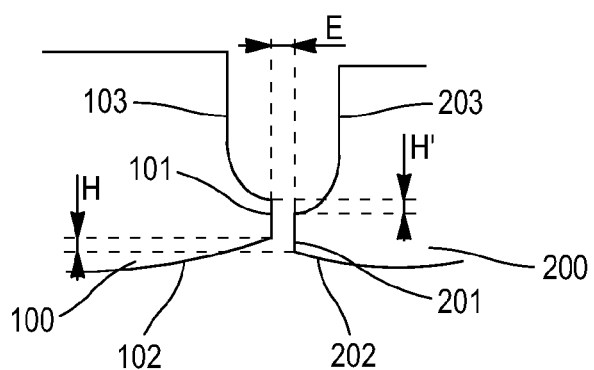
Figure 3C:
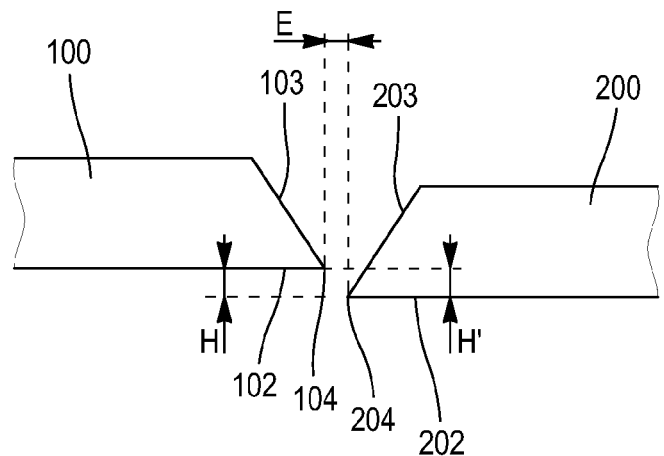

When it is considered that the actuators are sufficiently clamped onto the outside of the first pipe, and if this has not already been done, the end of the second pipe 200 is brought into contact with the end of the first pipe 100. Depending on the context, it may be desirable to have a determined longitudinal gap E between the two ends, as shown in FIGS. 3A, 3B, and 3C.

The second series of actuators 2 then clamps the end of the second pipe 200 from the outside, preferably in the same manner as the first series of actuators 1.

In a variant of the method, the equipment 10, 20, 1, 2 is positioned on the end of a first pipe 100 by means of centering fingers, and then the actuators 1 are clamped around the outside wall of the first pipe 100. The equipment is then stationary and fastened to said end. The end of the other pipe 200 is then brought into the equipment, as close as possible to being on the same axis as the end of the first pipe 100. Depending on circumstances, the ends of the pipes 100 and 200 are optionally put into contact.

The ends of the pipe 100 and 200 are then generally in alignment around their external diameters.

An operator, or alternatively one or more sensors, then evaluate(s) the hilo H, i.e. the radial offset between the first and second annular surfaces 101 and 201 respectively of the first and second pipes 100 and 200 at their respective inside surfaces 102 and 202. Usually, the radial offset H' is also measured at the surfaces 103 and 203 at the bottoms of the chamfer, i.e. from the outside of the pipe.

If the offset is monitored visually by the operator, then the operator generates manual commands for shifting one or the other of the pipes 100 and 200 in a transverse plane. This shifting may be the result of pulses or it may be performed continuously.

As a function of these hilo values, taken at several points of the inside surfaces of the pipes, the second pipe 200 is shifted in a plane parallel to the joint plane. Without going beyond the ambit of the invention, it is possible to envisage shifting the first pipe 100 while leaving the second pipe 200 stationary.

The relative shifts are preferably achieved by means of impulses that are controlled and monitored by an operator. Without going beyond the ambit of the invention, said shifts may be calculated and controlled by a computer such as a Programmable Logic Controller.

The pulses may serve to perform shifts lying in the range of 0.1 millimeters (mm) to 1 mm.

Such shifts are thus monitored and controlled in real time, either by the operator in person or by the computer.

The purpose is to reduce the hilo H or H' so as to maximize the facing areas of the surfaces 101 and 201. When the operator or the computer decides that the annular surfaces are facing each other with a sufficient accurately ratio, then the assembly is held in place. With chamfers that do not have root faces, the purpose is to reduce the radial offset H and H' between the end edges or lines 104 and 204 to make it as small as possible.

When coincidence between the annular surfaces is judged to be insufficient (by the operator or by a computer), then successive iterative shifts of one of the pipes 100 and 200 in the joint plane are carried-on.

The same method can be envisaged for the circumstances shown in FIGS. 3A and 3B in which a longitudinal gap E is voluntarily maintained between the end surfaces 101 and 201; naturally, the same method can be envisaged in the circumstances of FIG. 3C where a gap E is provided between the end edges or lines (minimum annular surfaces) 104 and 204 of pipes 100 and 200 that do not have root faces.

As mentioned above, it is then possible to control some of the actuators 1 and 2 individually in terms of thrust force and/or stroke so as to optimize the positioning of the pipes in order to reduce the hilo H or H'.

The method of the invention causes the actuators 1 or 2 to move in such a manner that some of the actuators may move in reverse (refract) while ensuring a constant thrust force on the end in question. The pressure needed for clamping is delivered accurately by means of a proportional solenoid valve that may be connected by a hose to each chamber of an actuator.

Advantageously, this operation is performed under specific control delivered by means of a computer.

The actuators are preferably of the hydraulic type: tests have been performed using ten hydraulic actuators placed around the ends of the first and second pipes; the feed/return circuits of said actuators have so-called "proportional" solenoid valves associated with pressure sensors, the actuators being fitted with displacement sensors of great accuracy.

In other words, since said actuators are fitted with accurate stroke sensors, it is possible to track the position of each pipe in real time by geometrical calculations. The option provided by the invention of using a computer to control individually the thrust force and/or the stroke of each actuator on the outside surface of the pipe enables movements to be generated of at least one end of a pipe facing the other end of another pipe; the speed, the direction, and the amplitude of these movements are thus fully controlled. The thrust forces are maintained during shifting of the pipe ends. When a desired position is reached, the system locks the stroke of the actuators.

Once the final position has been obtained, it is possible to detect that at least one actuator is exerting an inappropriate force on the external pipe surface, either too little or too much. It is then possible to correct individually, i.e. separately for each actuator, the force it applies so as to optimize the overall clamping around the pipe(s).

In addition, in a given clamping position, it is possible to detect a specific radial offset in a zone of the facing annular surfaces. This may be due for example to a localized geometrical defect of one of the ends of at least one of the pipes. It is then possible to modify individually the pressure and/or the stroke of at least one of the actuators so as to reduce this offset locally.

By way of illustration, a piece of equipment as shown in FIG. 1 has been built: five hydraulic actuators 1, 2 were fastened to each of the support rings 10 and 20. Each actuator 1, 2 operated at a pressure in the range 20 bars to 800 bars; presented a pushing/pulling capacity up to 100 (metric) tons and could withstand a radial load up to 30 (metric) tons; and with a stroke up to to 100 mm. Each actuator had an internal displacement sensor with an accuracy of 0.05 mm and resolution of 0.05 mm. The feed circuit for each actuator chamber had a pressure sensor making it possible to determine accurately the thrust force against the outside wall of a pipe end 100, 200; accuracy was 500 kilopascals (kPa) with resolution of 100 kPa; all of the sensors were connected to a controlling processing unit such as a microcomputer or a Programmable Logic Controller, e.g. under the trademark Allen Bradley in its Control Logix family; each actuator includes at least one hydraulic inlet for each of its two chambers, each being connected via a "quick" connector to a flexible hose capable of withstanding a pressure lying in the range 30 bars to 800 bars; the hose was itself connected to a hydraulic power feed unit.

Without going beyond the ambit of the invention, the actuators used could be electrical.

With such an arrangement in which the movement of the various actuators is controlled in the manner defined above, the behavior of the system comes close to that of a system in which the actuators are interconnected functionally and mechanically. Naturally such a fully mechanical solution would be complex, burdensome, and less reactive.

The present invention thus greatly improves the relative positioning of pipe ends on numerous technical grounds.

The invention claimed is:

1. A method for positioning an end portion of a first pipe relative to an end portion of a second pipe, the end portion of the first pipe being provided with a first substantially annular surface close to an inside surface of the first pipe and a first chamfer adjacent to the first annular surface, the end portion of the second pipe being provided with a second substantially annular surface close to an inside surface of the second pipe and a second chamfer adjacent to the second annular surface, said first annular surface and said second annular surface defining a joint plane, the method using a plurality of clamping actuators regularly distributed around the first pipe and the second pipe, the method comprising:
    A. prepositioning the first annular surface and the second annular surface facing each other;
    B. clamping each of the first pipe and the second pipe using the clamping actuators;
    C. evaluating a radial offset between the first annular surface and the second annular surface;
    D. controlling the plurality of clamping actuators to shift the second pipe relative to the first pipe parallel to said joint plane according to the radial offset between the first annular surface and the second annular surface so as to provide for a maximum facing area for the first annular surface and the second annular surface while maintaining the first pipe and the second pipe clamped.

2. The method according to claim 1, wherein step C comprises evaluating and monitoring said radial offset either visually or by using sensors, and wherein step D comprises transmitting and processing said radial offset by a calculation processing unit co-operating with at least some of said clamping actuators and controlling the movements of the at least some of said clamping actuators.

3. The method according to claim 1, wherein step C comprises evaluating and monitoring said radial offset relative to the inside surface of said first pipe and the inside surface of said second pipe.

4. The method according to claim 1, wherein step C comprises evaluating and monitoring said radial offset relative to the first chamfer and the second chamfer.

5. The method according to claim 1, wherein step B comprises:
    clamping the first end of the first pipe,
    bringing the second pipe approximately in line with the first pipe, and
    clamping the second pipe.

6. The method according to claim 1, wherein the clamping actuators comprise hydraulic actuator being associated with a solenoid valve which is controlled to supply an input of the hydraulic actuator with fluid, and with a proportional-type pressure regulator which controls an output of the hydraulic actuator.

7. A method for positioning an end portion of a first pipe relative to an end portion of a second pipe, the end portion of the first pipe being provided with a first substantially circular edge close to an inside surface of the first pipe and a first chamfer adjacent to the first circular edge, the end portion of the second pipe being provided with a second substantially circular edge close to an inside surface of the second pipe and a second chamfer adjacent to the second circular edge, the first circular edge and the second circular edge defining a joint plane, the method using a plurality of clamping actuators regularly distributed around the first pipe and the second pipe, the method comprising:
   A. prepositioning the first circular edge and the second circular edge facing each other;
   B. clamping each of the first pipe and second pipe using the clamping actuators;
   C. evaluating a radial offset between the first circular edge and the second circular edge; and
   D. controlling the plurality of clamping actuators to shift the second pipe relative to the first pipe parallel to the joint plane according to the radial offset between the first circular edge and the second circular edge so as to provide for a maximum facing area for the first circular edge and the second circular edge while maintaining the first pipe and the second pipe clamped.

8. The method according to claim 1 or claim 7, wherein step A comprises performing an alignment between an outside surface of the first pipe and an outside surface of the second pipe before step B.

9. The method according to claim 1 or claim 7, wherein step A comprises providing a longitudinal gap of a few millimeters is between the end portion of the first pipe and the end portion of the second pipe.

10. The method according to claim 1 or claim 7, wherein step D comprises individually controlling the clamping actuators to shift the end portion of the first pipe and the end portion of the second pipe relative to each other while maintaining the end portion of the first pipe and the end portion of the second pipe clamped by the clamping actuators.

11. The method according to claim 10, wherein step D comprises locking the clamping actuators in a clamping position and maintaining thrust forces applied to at least one of the first pipe or the second pipe after shifting of the first pipe and the second pipe.

12. The method according to claim 1, wherein step D comprises shifting at least one of the first pipe or the second pipe relative to each other so as to obtain a facing area lying in the range of 20% to 100% of at least one of an area of the annular surface of the first pipe or an area of the annular surface of the second pipe.

13. The method according to claim 12, wherein step D comprises locking the clamping actuators in a clamping position and maintaining thrust forces applied to at least one of the first pipe or the second pipe after shifting of the first pipe and the second pipe.

14. The method according to claim 1 or claim 7, wherein step D comprises locally modifying the radial offset by adjusting a position of at least one of the clamping actuators individually and separately.

15. The method according to claim 1 or claim 7, wherein in step C, at least some of the clamping actuators retract while ensuring a constant clamping thrust force on at least one of the first pipe or the second pipe.

* * * * *